Dec. 13, 1955  J. F. EDWARDS ET AL  2,726,930
CARBON DIOXIDE RECOVERY PROCESS
Filed Nov. 13, 1952
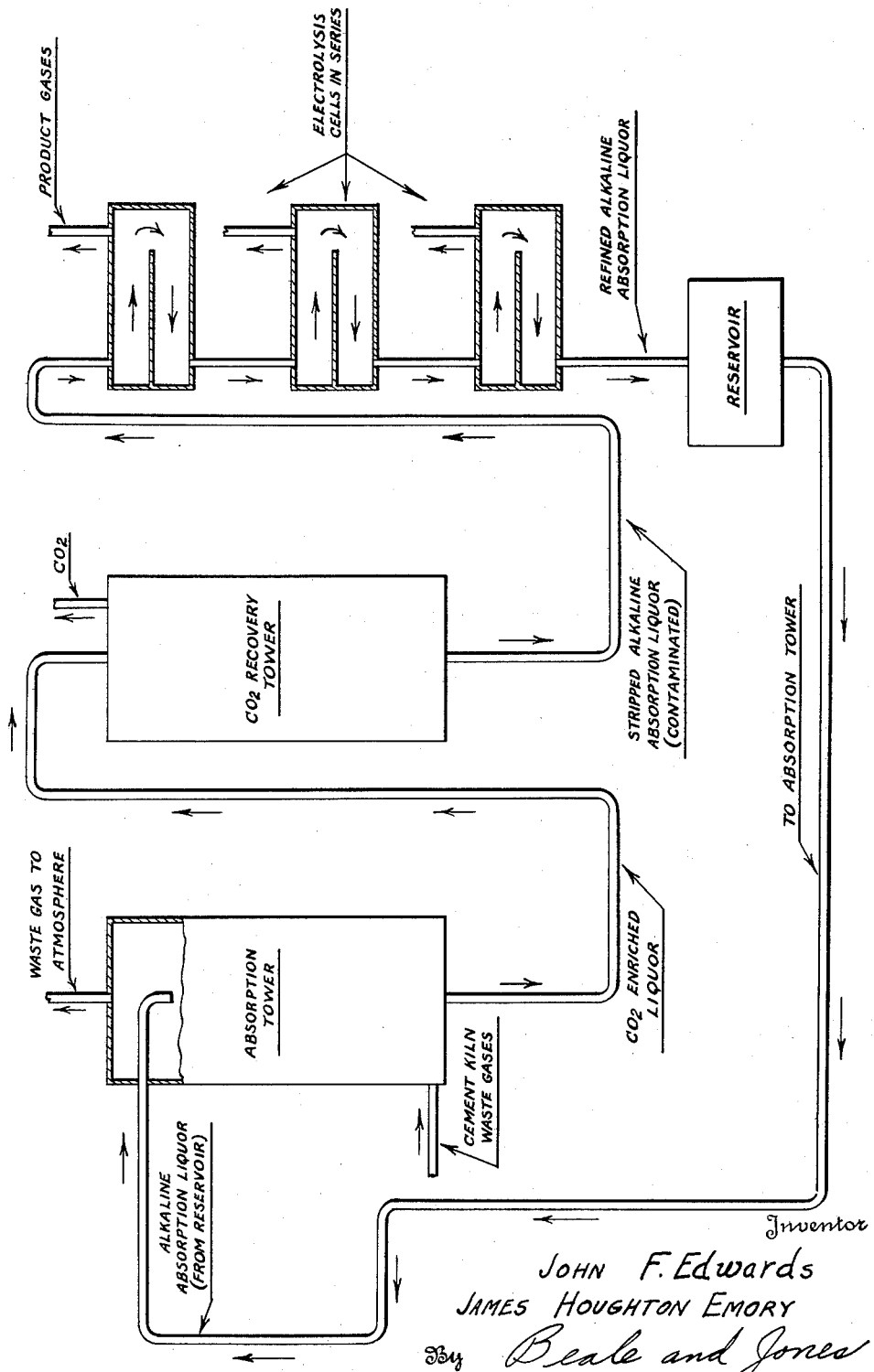
Inventor
John F. Edwards
James Houghton Emory
By Beale and Jones
Attorneys

United States Patent Office 2,726,930
Patented Dec. 13, 1955

2,726,930
CARBON DIOXIDE RECOVERY PROCESS

John F. Edwards and James H. Emory, Ada, Okla.

Application November 13, 1952, Serial No. 320,290

2 Claims. (Cl. 23—150)

This invention relates to an improvement in the process for recovering carbon dioxide from cement kiln, flue, and other gases.

The conventional process for recovering carbon dioxide from mixtures of gases obtained from flues, kilns, or other sources, involves a countercurrent extraction of the gas mixture by an alkaline solution. This process enjoys current wide use in producing carbon dioxide for the manufacture of dry ice. In this conventional process, the carbon dioxide in the gas mixture is absorbed by a solution of alkali hydroxide or carbonates, resulting in the formation of the alkali bicarbonate. The bicarbonate solution is decomposed by heat, to liberate carbon dioxide and reform the alkali hydroxide or carbonate. Usually only the carbonate is formed, since the decomposition of the carbonate to the hydroxide requires too much heat to be economical. The carbon dioxide thus produced is treated in the conventional manner to form dry ice. The alkaline solution is recycled in the process.

This process has proved fairly satisfactory over the years, but several important defects were inherent in the process. Until now, no economical method of correcting these defects has been proposed. We have been able to recognize the defects, discover the underlying causes therefor, and have now found an economical method for correcting them. The principal defect in the process is that when oxides of nitrogen are present in the mixture of gases being treated, nitric acid and various nitrites and nitrates are formed at different stages of the process, with undesirable results. The oxides of nitrogen are absorbed by the alkaline solutions, forming nitrites and nitrates. When the bicarbonate solution is heated to release carbon dioxide, partial decomposition of the nitrites and nitrates takes place, releasing oxides of nitrogen along with the carbon dioxide. These oxides of nitrogen then combine with water vapor to form nitrous and nitric acid, which of course are very detrimental to plant piping, and corrode bottle gas cylinders into which the gases are compressed. The nitrates remaining in the alkaline solution render a certain amount of the alkali ineffective for $CO_2$ absorption purposes, since it is chemically combined as a nitrate salt. This amount of alkali is therefore lost to the absorption system, and is useless. As the process continues, and more nitrates accumulate in the alkaline solution, the solution grows gradually weaker in alkalinity, and less and less effective in absorbing the carbon dioxide. Eventually the nitrate-contaminated solution must be discarded, and a fresh solution must be started through the system. If provision is made in advance in the system piping for changing solutions, the process need not be interrupted. However, the remarkable thing about nitrate contamination is that it often occurs when the oxides of nitrogen in the supply gas mixture are present in such minute amounts as to be undetectable. So in most cases, no provision for changing solutions during operations was made in the initial installation, and a shutdown and start-up of the entire operation is necessary. We believe that we are the first to recognize the source of, and to eliminate, as hereinafter described, the losses caused by nitrate contamination.

The principal object of our invention, therefore, is to eliminate nitrate contamination of the alkaline absorption liquor. A related object of the invention is to minimize the contamination of the carbon doxide gas product by undesired nitrogen acids, and to minimize the corrosion caused by such contamination in containers or apparatus subsequently employed with such gas.

A further object of our invention is to increase the overall efficiency of the carbon dioxide recovery process by prolonging the useful life of the absorption liquor and by increasing its absorption efficiency.

These and other objects of our invention are accomplished by removing the nitrates from the absorption liquor by the use of an electrolytic cell, which treats the absorption liquor as it leaves the system and is about to be recycled. Our system can best be understood by reference to the flow diagram in the accompanying drawing.

In the flow diagram, the cement kiln or other similar gases are supplied to the bottom of an absorption tower. This may be any conventional type of absorption tower. Those most commonly used are the bubble-cap tray towers, spray towers, and packed columns. All of these mentioned are countercurrent-type towers, and this is what is indicated schematically in the flow sheet. The alkaline absorption liquor is supplied at the top of the absorption tower, and the gas and liquor are in intimate contact within the tower. Unabsorbed gases are vented to the atmosphere. In practice, a series of absorption and recovery towers would probably be used, but for simplicity of illustration, only one of each is shown. The alkaline liquor, enriched by absorbed carbon dioxide, leaves the tower bottom and enters a recovery tower, which also may be a conventional piece of equipment. In this tower the bicarbonate-rich solution is heated and is preferably exposed in thin surface films, as for instance on Raschig rings, to allow for facile escape of the carbon dioxide. The carbon dioxide and other released gases leave the top of the recovery tower. The stripped alkaline liquor leaves the bottom.

The stripped liquor contains minute amounts of nitrites and nitrates. These contaminants are present in the liquor whenever any oxides of nitrogen are present in the flue gas or kiln gas used as a starting material. These contaminants were introduced into the liquor in the adsorption tower, when the alkaline solution or liquor was in intimate contact with the incoming gaseous mixture. The alkaline solution reacted with the oxides of nitrogen to produce alkali nitrates and nitrites. In the carbon dioxide recovery tower, there was a partial decomposition of the nitrates and nitrites in solution back into the nitrogen oxides, which left the recovery tower in admixture with the carbon dioxide gas. The salts which were not decomposed remained in solution. The alkaline solution is therefore contaminated with nitrite and nitrate salts, and to remove these impurities, the contaminated liquor is run through an electrolytic cell. The cell decomposes the nitrite and nitrate salts, and produces hydrogen, oxygen, and ammonia. Some carbon dioxide is also released by the heat produced in the cells by the electrolysis. The oxygen, hydrogen, and carbon dioxide are allowed to escape to the atmosphere, although it is possible to recover them. A portion of the ammonia dissolves in the alkaline solution. This of course increases the basicity of the solution and actually increases the absorption efficiency of the solution. Any ammonium carbonate formed in the absorption tower is decomposed in the recovery tower, releasing both ammonia and carbon dioxide. Some of the more soluble gas, ammonia, remains in solution, and some passes off with the carbon dioxide. That which remains in the absorption liquor increases the efficiency thereof as pointed out above. That which passes off with the carbon dioxide may be removed conventionally by an acidic absorbent, or may be compressed with the carbon dioxide so that it becomes a harmless component of the dry ice. The refined alkaline absorption liquor, freed of nitrites and nitrates by the electrolysis step, goes to a reservoir tank, from which it is recycled in the process.

In the flow diagram, three cells are shown in series. Any number may be used. The controlling factors of the process efficiency are the rate of flow in the cell, the current density, and the time allowed for complete electrolysis. The rate of flow in the cell controls both time of electrolysis and agitation within the cells. All of these factors may be worked out by trial and error to give the optimum results, and are within the province of one skilled in the art, once the basic concept is known.

To explain more fully our invention, we will describe in detail a process for commercial use.

EXAMPLE

*Carbon dioxide recovery from cement kiln gas*

In this process, gas from the cement kiln is scrubbed in a conventional gas scrubber, which is not shown, to remove dust and some of the water soluble contaminants. The gas is next pumped into an absorption tower. The tower is constructed with bubble cap trays to give intimate contact between the gas and alkaline liquor. Countercurrent flow is used. An 8% (by weight) solution of sodium carbonate is supplied to the top tray in the tower as the absorbing liquor. As the gas travels up the tower, carbon dioxide and any previously unremoved contaminants, including the oxides of nitrogen which are present, are absorbed. Unabsorbed gases pass out the top of the tower.

The temperature of the alkaline liquor as it enters the absorption tower is about 140° F. The temperature is not critical, but a range of 135° F. to 145° F. is usual in this apparatus because of residual heat in the liquor from the recovery unit and the electrolytic cell. This range of temperature or slightly above it, represents the optimum temperature for carbon dioxide absorption in sodium carbonate solution.

The recovery tower is also constructed with bubble cap trays. The $CO_2$-enriched liquor enters the recovery unit at the top of the tower. It is heated as it descends, and at the bottom of the tower is heated by a heating coil such as a high pressure steam coil. The released $CO_2$ in the recovery unit bubbles up through the descending bicarbonate solution and escapes at the top of the tower through a vent. The alkaline solution, which is stripped of carbon dioxide, is pumped into the first cell of a bank of electrolytic cells.

In the installation being described, forty-two cells are connected in series. The cells are mounted one slightly above another, to provide gravity flow throughout. The cells are constructed of 12% chromium stainless steel to avoid corrosion. A box form of cell is used, with the body of the box forming one electrode, and a plate, or plates, dipping in the box forming the other electrode. The solution passes from one box to the next in series by means of rubber hose or similar flexible piping. The electrodes are connected in series. A current density of ½ ampere per square inch of electrode surface is satisfactory. The only agitation used is due to the velocity of the solution as it passes from cell to cell. This velocity should be approximately two inches per second. The electrodes are spaced about ⅜ of an inch apart, so that in this installation a voltage of 125 volts will supply the necessary current density.

The cells give off a mixture of oxygen, hydrogen, carbon dioxide and ammonia. The resulting liquor is substantially free of any nitrate or nitrite contaminants, and the alkaline solution may be reused indefinitely. Passage through the cells also serves the purpose of keeping the liquor hot. An exit temperature in the range of 165° F. to 185° F. is the normal operating condition. The purified absorption liquor from the cells is stored in a reservoir for recycling in the system; and, if desired, the reservoir may be insulated to prevent undue loss of heat of the liquor.

While the mechanism of the purification process within the electrolytic cells is not perfectly clear, it is probable that the following explanation describes the principal reactions. The nitrates are reduced by nascent hydrogen which is produced at the cathode, as follows:

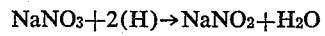

$$NaNO_3 + 2(H) \rightarrow NaNO_2 + H_2O$$

The nitrite is further reduced:

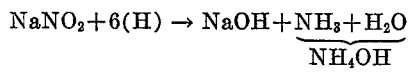

$$NaNO_2 + 6(H) \rightarrow NaOH + \underbrace{NH_3 + H_2O}_{NH_4OH}$$

The unwanted nitrates and nitrites are thus eliminated from the system. The sodium hydroxide and ammonia produced by the cells increase the efficiency of the absorption liquor by absorbing carbon dioxide in the absorption tower. The sodium hydroxide, of course, reverts back to the carbonate and bicarbonate. Had the electrolysis been omitted, the amount of sodium available as the hydroxide or carbonate would steadily decrease because of the cumulatively increasing content of sodium nitrite and nitrate.

In the specific example of our process described above, the cells were so connected that the solution flowed from one to the next in a series-type flow arrangement. However, they may also be connected in parallel, or in a combination of series and parallel arrangements. The particular arrangement used is not critical. When a large number of cells is connected in series, there is some loss of electrical efficiency. On the other hand, when parallel cells are used, the period during which the solution is subjected to electrolysis is decreased. A combined series-parallel arrangement of cells may be employed to obtain very economical results.

While we have described the use of sodium carbonate in our example above, it should be obvious that any conventional absorption solution may be used. The more common solutions in use include: sodium carbonate; potassium carbonate; a mixture of sodium and potassium carbonates; a mixture of a carbonate or carbonates initially containing sodium hydroxide. Approximately a 0.6 M solution is commonly used.

Having described our invention in detail, we claim:

1. A cyclic process for the recovery of carbon dioxide from gaseous mixtures containing carbon dioxide and an oxide of nitrogen, comprising the steps of intimately contacting an alkaline solution containing an alkali metal carbonate with the gaseous mixture, heating the solution to release carbon dioxide, then purifying the solution by subjecting it to electrolysis to decompose nitrate and nitrite salts at the cathode, and recycling the electrolyzed alkaline solution for further use in the process.

2. The process of claim 1 in which the alkaline solution is a sodium carbonate solution.

References Cited in the file of this patent

UNITED STATES PATENTS

| | | |
|---|---|---|
| 830,299 | Cassel | Sept. 4, 1906 |
| 2,031,844 | Moore | Feb. 25, 1936 |
| 2,044,888 | Overdick et al. | June 23, 1936 |
| 2,256,962 | Reich | Sept. 23, 1941 |
| 2,270,376 | Ladd | Jan. 20, 1942 |
| 2,559,580 | Alexander | July 10, 1951 |